(12) United States Patent
Razeti

(10) Patent No.: US 6,790,508 B2
(45) Date of Patent: Sep. 14, 2004

(54) MULTIPLE FILM SHEET FOR CONTAINERS WITH PEEL-OFF LIDS

(75) Inventor: Marco Razeti, Padova-Località Mandria (IT)

(73) Assignee: BP Europack S.p.A., Lugo di Vicenza (IT)

( * ) Notice: Subject to any disclaimer, the term of this patent is extended or adjusted under 35 U.S.C. 154(b) by 113 days.

(21) Appl. No.: 10/310,018

(22) Filed: Dec. 5, 2002

(65) Prior Publication Data

US 2003/0108714 A1 Jun. 12, 2003

(30) Foreign Application Priority Data

Dec. 7, 2001 (IT) ..................................... PD2001A0284

(51) Int. Cl.[7] .......................... B32B 3/10; B65D 51/22; B65D 41/44; B65D 43/02
(52) U.S. Cl. ...................... 428/138; 428/35.9; 428/138; 428/139; 428/140; 220/256.1; 220/258.3; 220/258.4; 220/258.5; 220/260; 220/265; 220/276; 220/270; 220/359.1; 220/359.2; 220/359.3; 426/122; 426/123; 229/123.1; 229/125.35; 215/232
(58) Field of Search ............................... 428/35.9, 138, 428/139, 140; 220/256.1, 258.3, 258.4, 258.5, 260, 265, 270, 276, 359.1–359.3; 229/123.1, 125.35; 215/232; 426/122, 123

(56) References Cited

U.S. PATENT DOCUMENTS

| | | | | |
|---|---|---|---|---|
| 4,636,273 A | | 1/1987 | Wolfersperger | 156/244.11 |
| 4,735,335 A | | 4/1988 | Torterotot | 220/270 |
| 5,062,569 A | * | 11/1991 | Hekal | 206/467 |
| 5,125,529 A | * | 6/1992 | Torterotot | 220/270 |
| 5,265,745 A | * | 11/1993 | Pereyra et al. | 215/232 |
| 5,620,550 A | * | 4/1997 | Andersson et al. | 156/252 |
| 6,056,141 A | * | 5/2000 | Navarini et al. | 220/269 |

FOREIGN PATENT DOCUMENTS

| | | |
|---|---|---|
| EP | 0 812 782 | 12/1997 |
| FR | 2 503 036 | 10/1982 |

* cited by examiner

Primary Examiner—Harold Pyon
Assistant Examiner—Chris Bruenjes
(74) Attorney, Agent, or Firm—Guido Modiano; Albert Josif; Daniel O'Byrne

(57) ABSTRACT

A sheet composed of multiple films for providing peel-off lids for containers comprising a first film set of films, with a film layer of aluminum, an external polythene film and an internal orientated plastic film; a second film set heat-sealed to the edge of a container to be closed, with a pre-perforated polyester film coupled, by an adhesive, to a non-perforated polythene film heat-sealed to the edge of the container; and a hot-extruded polythene layer interposed between the two film sets to couple the last polyester film of the first film set and the first polyester film of the second film set.

15 Claims, 2 Drawing Sheets

MULTIPLE FILM SHEET FOR CONTAINERS WITH PEEL-OFF LIDS

BACKGROUND OF THE INVENTION

The present invention relates to a sheet composed of multiple films for producing peel-off lids of containers made of plastics with preset opening by tearing of at least one film.

Sheets constituted by the mating of composite films that can be separated because of the reduced resistance to separation provided between two preset layers in contact are already known.

Containers for food products, such as yogurts, fruit juices, et cetera, with lids formed by means of such composite sheets are also known and achieve, upon separation by peeling of the external composite film, tearing of a preset region that gives access to the container in order to be able to extract the contained product.

As mentioned, these containers are mostly used in the food industries, and it is essential to comply with strict hygiene rules.

Accordingly, in normal conditions there must be no possibility of deterioration of the contained product.

Deterioration can occur for various reasons, such as the actions of ultraviolet rays, contamination with microorganisms, and intake of oxygen from the environment.

All these causes of deterioration are due to the structure of the composite sheet, which does not provide the certainty of forming an assured barrier.

EP-812,782 discloses a sheet composed of multiple films for lids of containers, which can be opened by peeling off one film with respect to another and in which during opening a pre-scored portion of the film is removed and remains attached to the container, exposing a hole.

Due to the above cited hygiene requirements, the pre-scored portion should not be of the through type, but this characteristic, owing to the low thickness of the layers involved, is not ensured, and any through holes, even if small, make the layer of film of the pre-scored region ineffective as a barrier.

SUMMARY OF THE INVENTION

The aim of the present invention is to provide a composite sheet for forming peel-off lids of containers made of plastics with preset opening that eliminates the drawback noted above in known types of sheets.

Within this aim, an object of the invention is to provide a sheet whose peelable part allows its easier separation with respect to the rest in order to make the container opening operations convenient for the user.

Another object is to provide an assured barrier against contaminations of the product contained in the container to which the sheet is applied.

Another object is to provide a composite sheet that can be manufactured with conventional equipment and systems.

Another object is to make attempts to tamper with the opening automatically evident.

This aim and these and other objects that will become better apparent hereinafter are achieved by a sheet composed of multiple films for providing peel-off lids of containers made of plastics with preset opening, characterized in that it comprises:

a first set of films, comprising a film constituted by a layer of aluminum or equivalent material, coated externally with a film of polythene and coupled inward, by means of an adhesive, to an orientated last plastic film;

a second set of films, the last one being heat-sealed to the edge of a container to be closed, said second set of films comprising a pre-perforated first orientated plastic film that is coupled, by means of an adhesive, to a non-perforated polythene film that is heat-sealed to said edge of the container;

a hot-extruded polythene layer being interposed between said two film sets and rigidly coupling the last orientated plastic film of the first set of films and the first orientated plastic film of the second set of films, penetrating furthermore between the holes of the first orientated plastic film of said second set and being heat-sealed to the polythene film of the second set of films, which is the last film and is heat-sealed to the edge of the container.

BRIEF DESCRIPTION OF THE DRAWINGS

Further characteristics and advantages of the invention will become better apparent from the following detailed description of an embodiment thereof and of a typical application thereof to a container, which is illustrated only by way of non-limitative example in the accompanying drawings, wherein.

DESCRIPTION OF THE PREFERRED EMBODIMENTS

Figure 1:
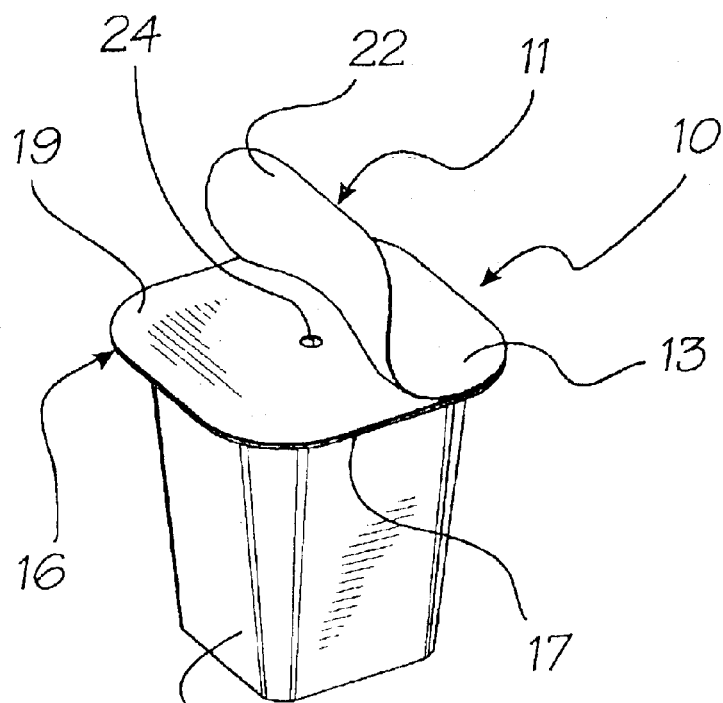
FIG. 1 is a perspective view of a first container with a lid, provided by means of a sheet according to the invention, during opening.
Figure 4:
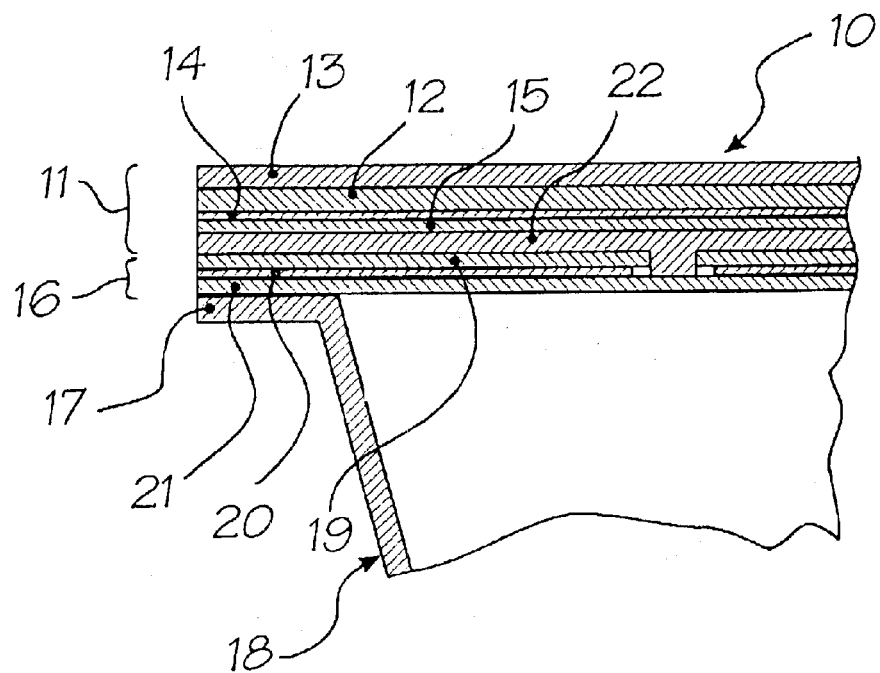
FIG. 4 is an enlarged-scale sectional view of the upper part of the container of FIG. 1, in the closed configuration.
Figure 5:
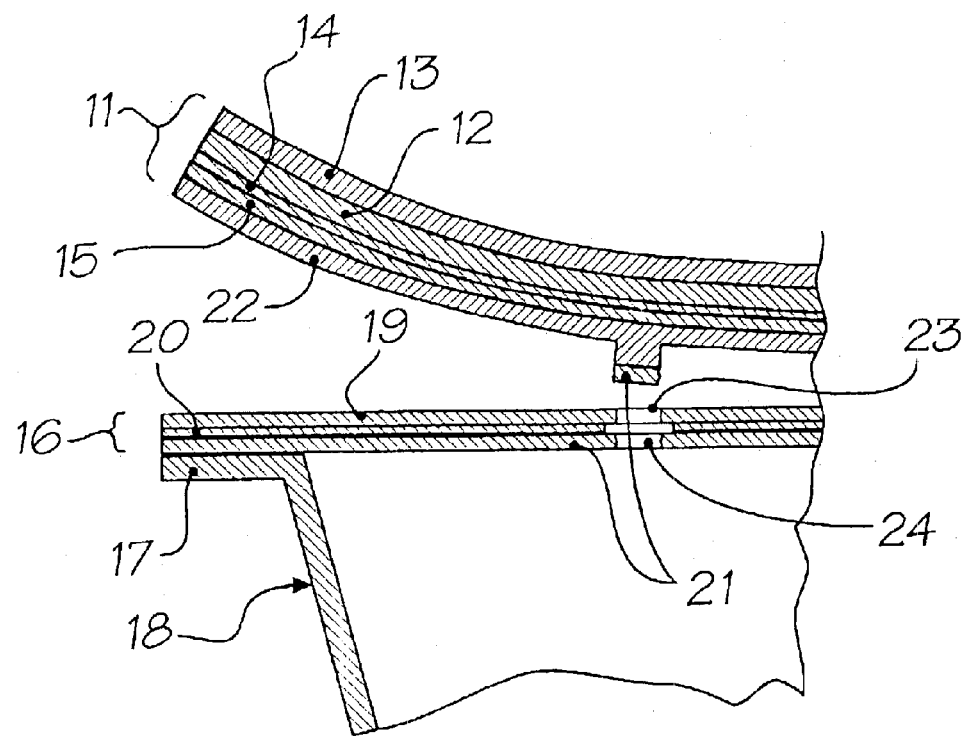
FIG. 5 is an enlarged-scale sectional view of the upper part of the container of FIG. 1 during opening.

With reference to FIGS. 1, 4 and 5, a sheet composed of multiple films according to the invention is generally designated by the reference numeral 10 and is used to provide peel-off lids of containers 18 made of plastics, for example made of high-density polythene, polystyrene or the like, with a preset opening.

The sheet 10 is composed of a first set 11 of films, which comprises a film 12 that is constituted by a layer of aluminum or equivalent material that is coated externally with a polythene film 13 and is coupled inward, by means of an adhesive polyurethane 14, to an orientated film 15 made of a plastic material such as polyester.

The sheet further comprises a second set 16 of films, the last of which is heat-sealed to an edge 17 of the container 18 to be closed, and comprises an orientated film 19 made of plastics such as pre-perforated polyester that is coupled, by means of an adhesive polyurethane 20, to a film 21 made of non-perforated polythene that is heat-sealed to said edge 17 of the container 18.

A layer 22 of hot-extruded polythene is interposed between said two sets of films 11 and 16 and rigidly couples the last polyester film 15 of the first set 11 and the first polyester film 19 of the second set 16, penetrating between the holes 23 of the first polyester film 19 of said second assembly 16 and heat-sealing itself to the polythene film 21 of the second set 16 of films, which is the last one and is heat-sealed to the edge 17 of the container 18.

Upon opening, as explained more clearly hereinafter, separation occurs between the hot-extruded polythene layer 22 and the first polyester film 19 of the second set of films and the polythene which, having passed through the holes 23, by adhering firmly to the last polythene film 21 of the second set 16, tears it with the shape of the hole, forming an opening 24 that provides access to the inside of the container 18.

The quantity of polyurethane adhesive 14 can be conveniently 3–4 grams per square meter, and a thickness of approximately 40 microns is preferred for the polythene film 13.

The polyester film 15 preferably has a thickness of 12 microns.

The first set 11 of films can be provided independently and the second set 16 can be coupled subsequently.

In the second set of films 16, to be heat-sealed to the edge 17 of the container 18, the thickness of the polyester film 19 is 12 microns and a thickness of 30–40 microns is provided for the polythene film 21.

For the adhesive 20, the quantity is the same as for the preceding cases, i.e., 3–4 grams per square meter.

The layer 22 of hot-extruded polythene is made to adhere more to the polyester film 15 of the first set 11 than to the polyester film 19 of the second set 16.

This is achieved by spreading, between the layer 22 and the film 15, an adhesion-promoting primer and optionally by spreading a release agent between the layer 22 and the film 19.

For the hot-extruded polythene layer 22, the thickness is between 12 and 15 microns, and the quantity of adhesion-promoting primer is 0.6 grams per square meter.

As mentioned, the particularity of the sheet 10 according to the invention is due to the fact that when the first set 11 of films is peeled from the second set 16, the layer 22 of hot-extruded polythene separates from the polyester film 19 of the second set 16 because it adheres more to the film 15 of the first set 11.

Moreover, the polythene of the layer 22, which adheres snugly to the polythene of the film 21 of the second set 16, by separating, tears the polythene of the film 21 at the hole 23 of the polyester film 19, forming the through hole 24, through which it is possible to access the product contained in the container 18.

It should also be noted that attempts to tamper with the opening have been rendered automatically evident.

Figure 2:
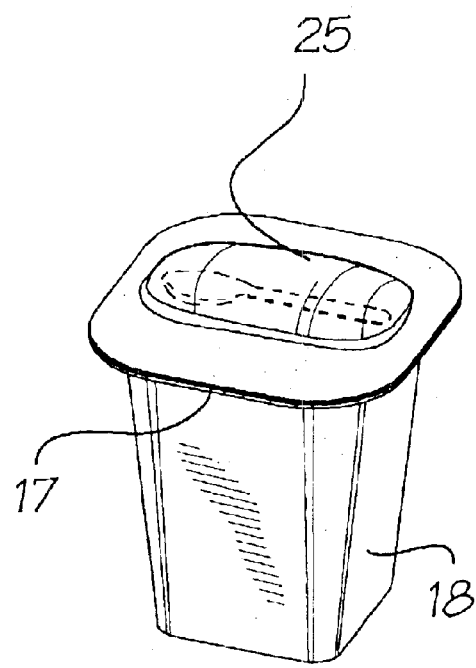
FIG. 2 is a perspective view of a second container with a lid, provided by means of a sheet according to the invention, in the closed configuration.
Figure 3:
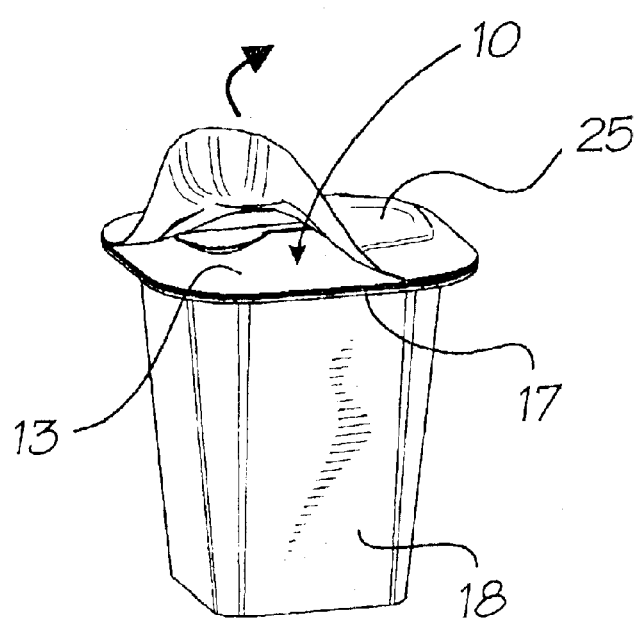
FIG. 3 is a perspective view of the second container with a lid, during opening.

With reference to FIGS. 2 and 3, a dome 25 can also be provided conveniently by adhesion on the polythene film 13; said dome can be made for example of the same material as the container 18 and is designed to contain for example a spoon or a product to be consumed together with the product contained in the container 18.

In practice it has been found that the intended aim and objects of the present invention have been achieved.

The invention thus conceived is susceptible of numerous modifications and variations, all of which are within the scope of the appended claims.

All the details may further be replaced with other technically equivalent elements.

In practice, the materials employed, so long as they are compatible with the contingent use, as well as the dimensions, may be any according to requirements.

The disclosures in Italian Patent Application No. PD2001A000284 from which this application claims priority are incorporated herein by reference.

What is claimed is:

1. A multiple film sheet for peel-off lids for plastic containers with preset opening, comprising:

a first film set, including a film layer of aluminum, an outer film of polythene coated externally to said aluminum film layer, a last, orientated plastic film, and an adhesive layer provided between the aluminum film layer and the orientated plastic film;

a second film set, including a first pre-perforated orientated plastic film, a last non-perforated polythene film that is heat-sealed to an edge of a container, and an adhesive layer provided between said orientated plastic film and said polythene film; and a hot-extruded polythene layer being interposed between said first and second film sets and coupling the last orientated plastic film of the first film set and the first orientated plastic film of the second film set, said hot-extruded polythene layer penetrating holes of the first orientated plastic film of said second film set and being heat-sealed to the non-perforated polythene film of the second film set, which is heat-sealed to the edge of the container.

2. The sheet of claim 1, further comprising an adhesion-promoting primer spread between said hot-extruded polythene layer and the last, orientated plastic film of the first set, which makes said layer of hot-extruded polythene adhere more to the last, orientated plastic film of the first film set than to the first orientated plastic film of the second film set.

3. The sheet of claim 2, wherein said adhesion-promoting primer is spread in a quantity of approximately 0.6 grams per square meter.

4. The sheet of claim 1, further comprising a release agent spread between said hot-extruded polythene layer and the first orientated plastic film of the second film set, so that said hot-extruded polythene layer is made to adhere more to the last oriented film of the first film set than to the first orientated plastic film of the second film set by spreading.

5. The sheet of claim 1, wherein said adhesive layer of the first film set is an adhesive polyurethane.

6. The sheet of claim 5, wherein said adhesive polyurethane is provided in a quantity of 3–4 grams per square meter.

7. The sheet of claim 1, wherein said polythene film of the first film set has a thickness of approximately 40 microns.

8. The sheet of claim 1, wherein said first orientated plastic film of the second film set has a thickness of approximately 12 microns.

9. The sheet of claim 1, wherein said adhesive layer of the second film set is adhesive polyurethane.

10. The sheet of claim 9, wherein said adhesive polyurethane is provided in a quantity of 3–4 grams per square meter.

11. The sheet of claim 1, wherein said last polythene film of said second film set has a thickness of approximately 30–40 microns.

12. The sheet of claim 1, wherein said layer of hot-extruded polythene has a thickness of approximately 12 to 15 microns.

13. The sheet of claim 1, wherein said first film set is provided independent and subsequently coupled to said second film set.

14. The sheet of claim 1, further comprising a containment dome bonded by adhesion on the outer polythene film of said first film set.

15. The sheet of claim 1, wherein said last orientated plastic film of the first film set and said first orientated plastic film of the second film set are made of polyester.

* * * * *